July 28, 1942.  E. A. DUHALT  2,290,951
DEVICE FOR MAKING CONCRETE PIPES BY CENTRIFUGAL ACTION
Filed July 16, 1940  3 Sheets-Sheet 1

INVENTOR:
ENRIQUE A. DUHALT.
BY Julian J. Wittel,
his attorney.

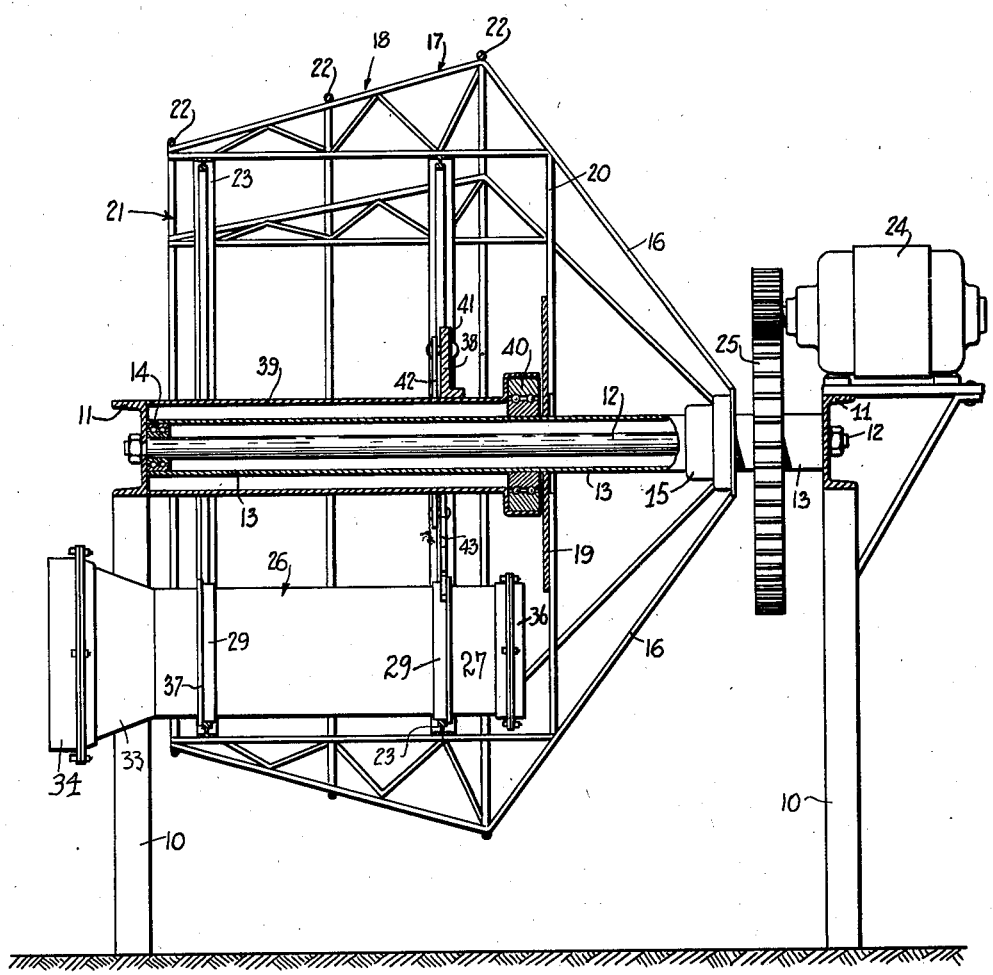

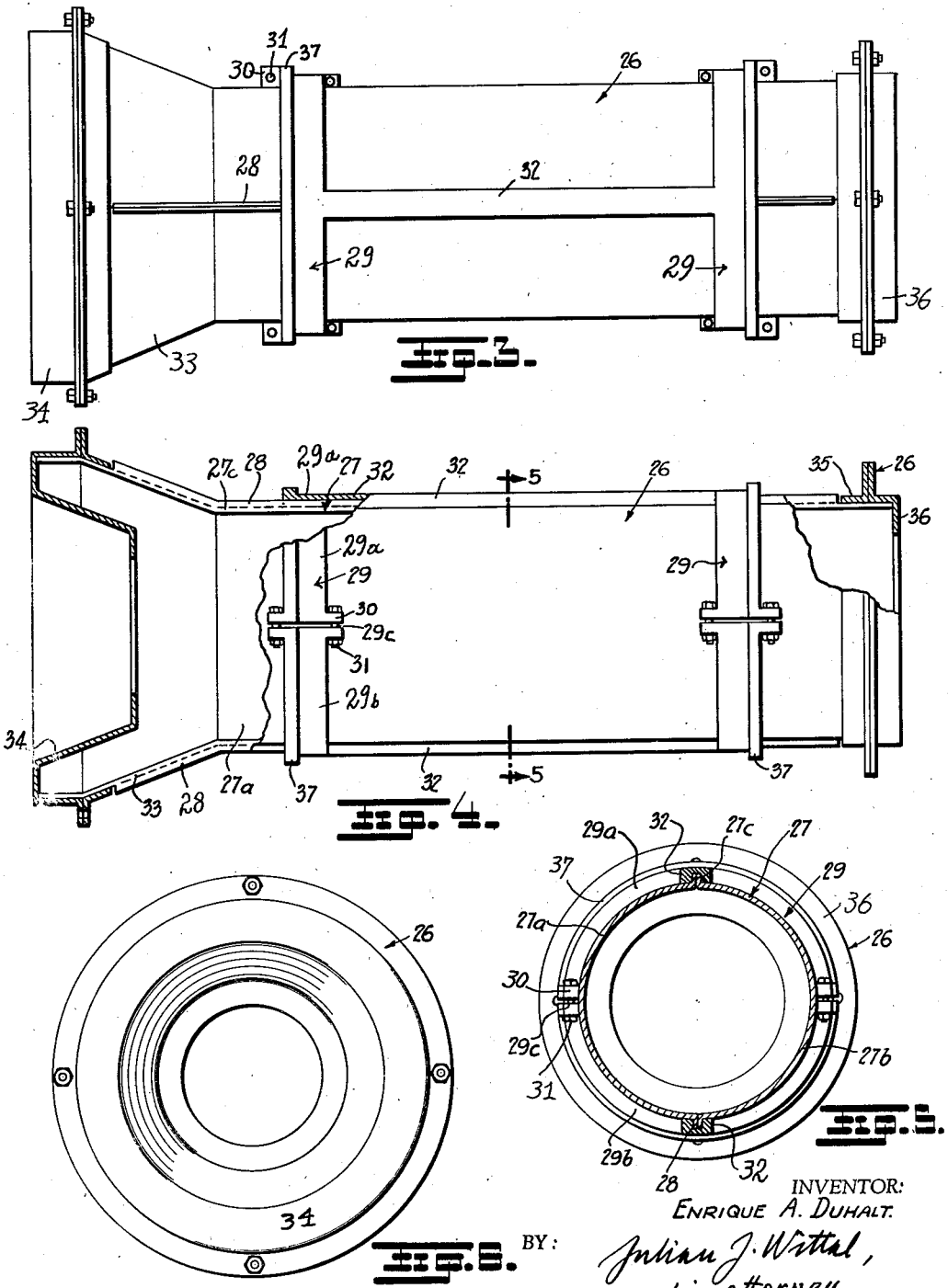

Patented July 28, 1942

2,290,951

UNITED STATES PATENT OFFICE 2,290,951

DEVICE FOR MAKING CONCRETE PIPES BY CENTRIFUGAL ACTION

Enrique A. Duhalt, Mexico City, Mexico

Application July 16, 1940, Serial No. 345,743
In Mexico July 21, 1939

5 Claims. (Cl. 25—30)

This invention relates to devices for manufacturing concrete pipes, and has for its main object to provide a device of this character which will be more simple in construction and more efficient in operation than the devices at present used for such purpose.

A further object of this invention is to provide a device as characterized hereinbefore, which will produce superior concrete tubes to those produced heretofore, and which will be easy to operate, reliable and resisting in construction, and will produce larger quantities of tubes with the same amount of investment, lapor and power than is the case with other similar devices now used.

Further objects of this invention will be apparent as the specification of the same proceeds.

In the drawings accompanying this specification and forming a part thereof,

Fig. 2 is a partly sectional side elevation thereof;

Fig. 3 is a side elevational view of the rotating concrete tube forming mold proper, and Fig. 4 is another side elevation thereof at right angles to that of Fig. 3 and partly in section;

Fig. 5 is a cross sectional elevation of said mold, the section being taken on the line 5—5 of Fig. 4, while Fig. 6 is a front elevational view of said mold.

Figure 1:
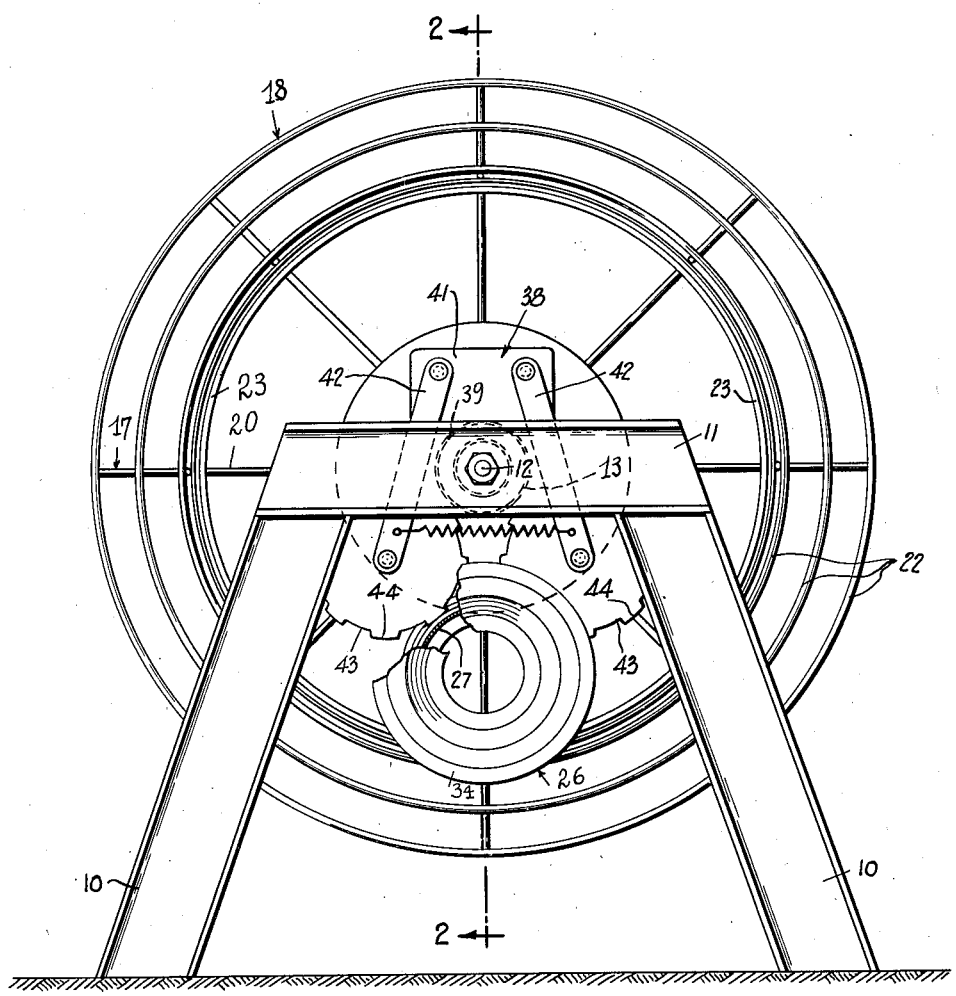
Fig. 1 is a front elevation of my device.

Referring now to the drawings more in detail by characters of reference, the numerals 10 indicate two leg structures or frames for my device, into the upper cross members 11 of which is secured a stationary shaft or axle 12. A tubular rotating shaft 13 is arranged around the axle 12 on ball bearings 14 at the two ends thereof. A hub 15 is secured near the right hand end of the rotating tubular shaft 13 and eight oblique reinforcing arms 16 connect the eight elements 17 of a circular outer structure generally indicated by the numeral 18, with said hub 15.

Spaced apart from said hub 15 and to the left thereof is secured a member 19 on the tubular shaft 13 and further radial reinforcing arms 20 are secured into said member 19 to connect the same with said outer structural units 17.

Said structural units 17 preferably are of the shape shown in Fig. 2 and are arranged around the circumference of the device to form a hollow cylindrical open structure of light weight and great strength, the left hand end 21 of which is entirely open and unobstructed.

Several circular metal rings 22 may be arranged on the outside of the cylindrical open structure 18 to further reinforce the same and to secure the parts thereof together, while two circular rails 23 are secured on the inner cylindrical surface thereof, as indicated in Figs. 1 and 2.

An electric motor 24 may be provided to drive the shaft 13 through the gears 25.

The concrete pipes are formed in a rotating tubular mold, generally indicated by the numeral 26, said mold being formed of an innermost tubular mold proper, generally indicated by the numeral 27, and comprising the two halves 27a and 27b, said halves having the cooperating flanges 28 at their separation lines.

The two halves of the inner mold 27 are secured together in a detachable manner by two flanged rings, generally indicated by the numeral 29, each being composed of the two halves 29a and 29b, each half having the bosses 30 at their meeting surfaces whereby the same may be secured together, and on the inner mold 27, by the use of the bolts 31.

The separation line 27c between the two halves 27a and 27b of the inner cylindrical mold 27 is set at right angles to the separation line 29c between the two halves 29a and 29b of the flanged rings 29.

Each half of the flanged rings 29 is connected by a bar 32 in the middle thereof, each of said bars, as well as the flanged rings at their ends, having slots provided on their inner surfaces at the places of the flanges 28 of the inner tubular mold 27, so that said flanged rings and bars may be placed on said tubular inner mold 27 with their slots housing the flanges 28, as indicated in Figs. 4 and 5, and it will be seen that when the flanged rings 29 are placed over the inner mold 27, in the manner indicated, and then secured together by the bolts 31, they will firmly keep the inner mold in a closed and sealed position and they will be firmly secured thereon. The front end of the inner mold 27 is somewhat flaring or being gradually larger in diameter, as indicated at 33, and to said front end is secured a head 34 of the shape indicated in the section of Fig. 4, while the rear end 35 of the inner mold 27 is left cylindrical and another head 36 of the shape indicated in the drawings is secured thereon.

Flanged rings 29 have projecting rails 37, whereby they may be placed on and along the rails 23 in the rotating structure 18, as indicated in Fig. 2.

The use and operation of my device will be obvious to those versed in the art, but I still want to offer the following remarks to further explain the same.

When the rotating tubular mold 26 is placed within the rotating cylindrical structure 18 in the manner described and shown in Fig. 2, and said structure rotated by the action of the motor 24, the mold 26 will also rotate with a higher speed than the structure 18 through the frictional connection between the rails 23 and the flanged rings 29.

The concrete material is thrown inside of the mold 26 and the centrifugal action will throw it against the walls thereof and after the necessary rotation, the concrete material will set into a tubular form, as will be obvious, after which the mold 26 may be taken out and another one placed into the rotating structure 18, while, after the setting of the concrete tube therein, the mold 26 may be taken apart, the concrete tube removed, and the mold again assembled, as will be obvious.

To improve the quality of the tube produced, I employ the vibration devices, generally indicated by the numeral 38. These vibration devices preferably are arranged in the plane of each of the rails 23 and their construction is as follows:

An outermost tube 39 is arranged around a portion of the rotating shaft 13, being secured to the left hand end or front upper member 11 of the frame structure, by any appropriate means, and having ball bearings 40 at its right end through which the shaft 13 may rotate within said tube 39.

Each vibration or shaker device 38 is composed of a plate member 41 secured on the tube 39, and two pivoted arms 42 are suspended on the plate 41, each arm having a rotatable disc 43 at its lower end, said discs 43 ride on the respective flanged rings 29 and will keep on hitting and knocking them during the rotation of the mold 26, thereby vibrating and shaking the concrete material and causing a better setting and a more homogeneous mixing thereof.

To aid the discs 43 in their operation, they may be provided with projections, teeth, or cogs 44 around their circumferences.

While I have described a preferred embodiment of my invention, I want it to be understood that changes and variations may be resorted to in the construction, elements and combination thereof, and I reserve my right to such changes which are within the spirit of this specification and scope of the claims hereunto appended.

What I claim as new and desire to protect in a patent of the United States Patent Office is:

1. In a device for manufacturing concrete pipes of the type in which a mold for the concrete pipe is rotated by friction within a rotating outer structure, a stationary axle, a tubular shaft around said axle, means to rotate said tubular shaft, a hollow cylindrical structure around said tubular shaft secured to the same and rotating therewith, one end of said cylindrical hollow structure being open and non-obstructed, said structure being adapted to receive the usual tubular mold for forming a concrete pipe placed axially therein and caused to rotate through frictional engagement therewith, the concrete material being fed into said tubular mold and the concrete pipe formed by centrifugal action thereon.

2. In a device as set forth in claim 1, circular rails on the inside of said cylindrical structure, adapted to receive a tubular mold placed thereon.

3. In a device as set forth in claim 1, a stationary tube around a portion of said tubular shaft, pivoted arms arranged on said stationary tube, and rotatable discs on said pivoted arms.

4. In a device as set forth in claim 1, a stationary tube around a portion of said tubular shaft, pivoted arms arranged on said stationary tube, rotatable discs on said pivoted arms, and means to resiliently and yieldingly secure said arms to one another.

5. In a device as set forth in claim 1, a stationary tube around a portion of said tubular shaft, pivoted arms arranged on said stationary tube, rotatable discs on said pivoted arms, said discs having projections or teeth around their circumference.

ENRIQUE A. DUHALT.